(12) United States Patent
Hodnefjell et al.

(10) Patent No.: US 8,201,803 B2
(45) Date of Patent: Jun. 19, 2012

(54) ACTUATOR DEVICE

(75) Inventors: Lars Gunnar Hodnefjell, Mosteroy (NO); Stale Hope, Vestskogen (NO)

(73) Assignee: Ifokus Engineering AS, Stavanger (NO)

( * ) Notice: Subject to any disclaimer, the term of this patent is extended or adjusted under 35 U.S.C. 154(b) by 716 days.

(21) Appl. No.: 12/373,381

(22) PCT Filed: Jul. 2, 2007

(86) PCT No.: PCT/NO2007/000246
§ 371 (c)(1),
(2), (4) Date: Feb. 18, 2009

(87) PCT Pub. No.: WO2008/007969
PCT Pub. Date: Jan. 17, 2008

(65) Prior Publication Data
US 2009/0302248 A1 Dec. 10, 2009

(30) Foreign Application Priority Data
Jul. 13, 2006 (NO) .................................. 20063249

(51) Int. Cl.
*F16K 31/44* (2006.01)
(52) U.S. Cl. ................... 251/71; 251/68; 251/129.11
(58) Field of Classification Search .............. 251/68, 251/69, 70, 71, 129.03, 129.11
See application file for complete search history.

(56) References Cited

U.S. PATENT DOCUMENTS

| | | | |
|---|---|---|---|
| 5,195,721 A | 3/1993 | Akkerman | |
| 5,497,672 A * | 3/1996 | Appleford et al. | ........... 74/89.29 |
| 5,983,743 A | 11/1999 | McGregor et al. | |
| 5,984,260 A | 11/1999 | Rawson et al. | |
| 7,992,457 B2 * | 8/2011 | Hodnefjell et al. | .......... 74/89.39 |

FOREIGN PATENT DOCUMENTS
GB 2266943 11/1993

OTHER PUBLICATIONS

PCT Office, "Written Opinion of the International Searching Authority," PCT Office, (Oct. 25, 2007).

* cited by examiner

*Primary Examiner* — John Fristoe, Jr.
(74) *Attorney, Agent, or Firm* — GableGotwals

(57) ABSTRACT

An actuator device comprising an actuator housing with a fitting for connecting the actuator to an object, a motor, which via transmission elements, drives an output actuator shaft of the actuator, where the actuator shaft is rotationally disconnectable from the motor, the actuator shaft being rotatable between two angular positions where the one angular position may correspond to the object being in a first condition and the other angular position may correspond to the object being in a second condition, and where the actuator is provided with an element for storage of mechanical energy, the element by energy cut-off to the actuator being releasably arranged to be able to displace a nut being prevented from rotating around its longitudinal axis, along a screw thread complementary fitting to the nut, and connected to the actuator shaft, whereby the actuator shaft is rotated between the two angular positions.

7 Claims, 3 Drawing Sheets

ACTUATOR DEVICE

CROSS-REFERENCE TO PENDING APPLICATIONS

This application is based on PCT Patent Application No. NO2007/000246, filed on Jul. 2, 2007, which was based on Norwegian Patent Application No. 20063249 filed on Jul. 13, 2006.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable

BACKGROUND OF THE INVENTION

This invention relates to an actuator. More specifically it concerns an actuator comprising an actuator housing including a fitting for connecting the actuator to an object, and a motor which via transmission elements drives an output actuator shaft of the actuator, wherein the actuator shaft is rotationally disconnectable from the motor. The actuator shaft is rotatable between two angular positions whereof one angular position may correspond to the object being in a first condition and the other angular position may correspond to the object being in a second condition. The actuator is provided with an element, typically a spring, for mechanically storage of energy, the element, by energy cut-off to the actuator, being releasably arranged to be able to displace a nut being prevented from rotation around its longitudinal axis along a screw thread complementary fitting to the nut and connected to the actuator shaft, whereby the actuator shaft is rotated between the two angular positions.

The following is based on the actuator being utilised for operating a valve. This entails no limitation in the scope of the invention, but serves as a useful basis for explaining the features of the invention.

Electric actuators have among other things, due to their simple connection, seen a considerably increased use. Electrical actuators have, however, according to prior art, a weakness in that they have difficulties in closing a valve in case the electric supply to the actuator fails.

Some actuators are provided with auxiliary equipment for manually rotating or displacing the actuator output shaft to a position wherein the valve is closed. Such auxiliary equipment is of no avail if the actuator is situated in a position where access is difficult, such as submerged.

BRIEF SUMMARY OF THE INVENTION

The object of the invention is to obviate or mitigate at least one of the prior art drawbacks.

The object is achieved according to the invention by the features presented in the description below and in the following Claims.

An actuator in accordance with the invention comprises an actuator housing with a fitting for connecting the actuator to an object, and a motor, which via a transmission element drives an output actuator shaft of the actuator. The actuator shaft is rotationally disconnectable from the motor, the actuator shaft being rotatable between two angular positions. The one angular position may correspond to the object being in a first condition, for example an open condition in case the object is a valve, and the other angular position may correspond to the object being in a second condition, for example a closed condition. The actuator of the invention is characterized in that it is provided with an element for mechanically storing of energy, typically a spring, wherein the element by energy cut-off to the actuator is releasably arranged to be able to displace a nut being prevented from rotation around its longitudinal axis along a screw thread being complementary to the nut and connected to the actuator shaft, whereby the actuator shaft is rotated between the two angular positions.

Thus, the actuator is able to for example to close a valve in case of failure in the electrical supply to the actuator.

As the nut is displaceable back to its initial position, the element may be supplied with renewed energy by rotating the screw thread in the reverse direction by means of the motor. To be able to displace the spring holder to its initial position the nut has an abutting face towards the spring holder complementary fitting a shoulder in the spring holder.

The element for storing mechanical energy is normally constituted by at least one spring clamped between the actuator housing and a spring holder being displaceable relative to the actuator housing. The spring holder is releasably connected relative to the actuator housing by means of a first releasable connector.

There is a gearbox built in between the motor and the actuator shaft, among other things to increase the actuator output torque. The gearbox housing is connected to the actuator housing via a second releasable connector.

The screw thread is connected to and co-rotates, possibly via a gear train, with the gearbox output shaft. The gearbox output shaft is in turn connected to the actuator shaft by means of a third releasable connector.

The mode of operation of the actuator is explained below in the specific part of the specification.

The invention provides an actuator with a rotatable actuator shaft provided with a so-called failsafe function, i.e. that the actuator, in case of energy failure, can move such as a valve to a safe condition.

BRIEF DESCRIPTION OF THE DRAWINGS

In what follows is described a non-limiting example of a preferred embodiment illustrated by the accompanying drawings, in which.

DETAILED DESCRIPTION OF THE INVENTION

Figure 1:
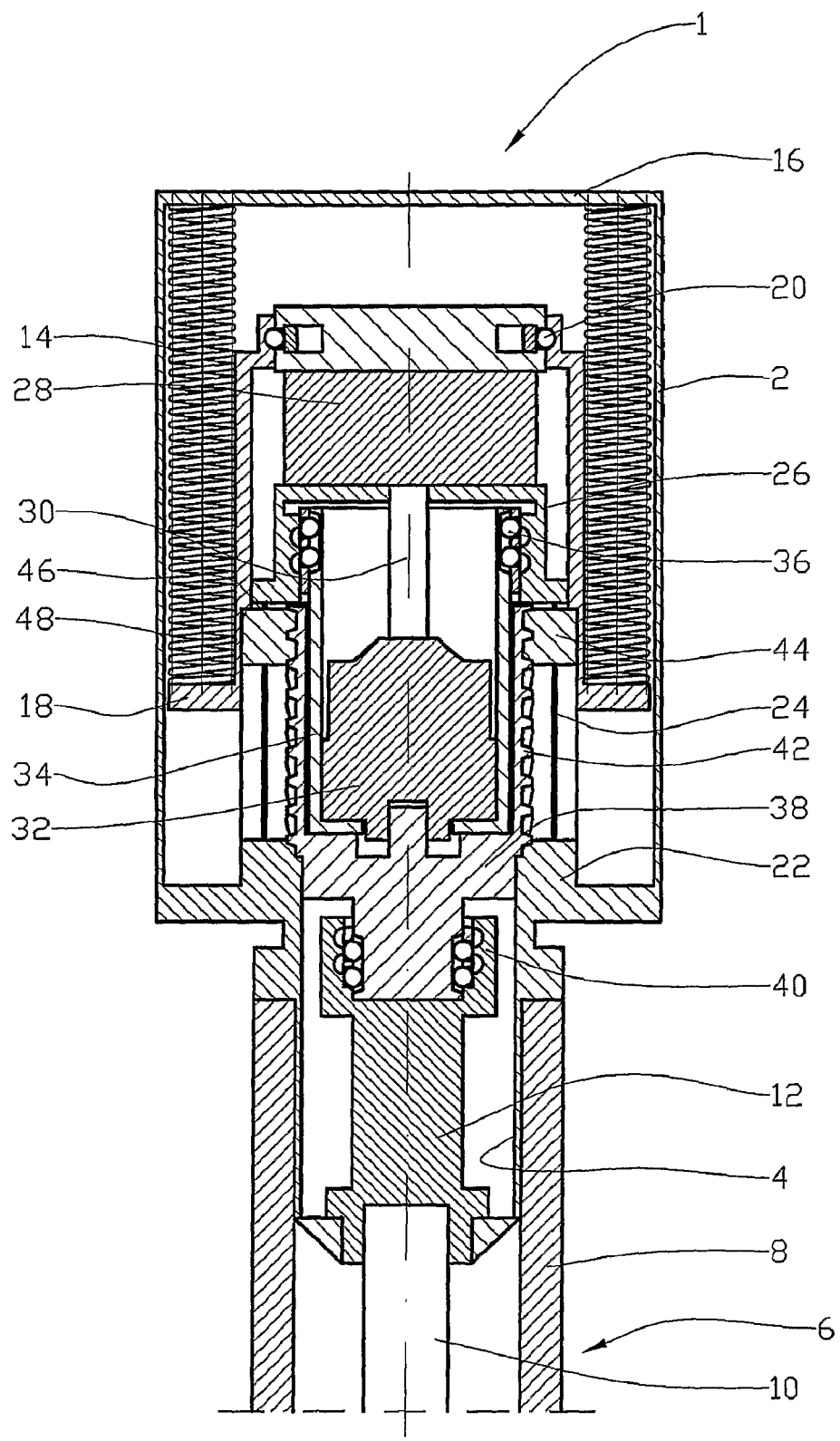
FIG. 1 shows, in section, a principal sketch of an actuator in accordance with the invention where the actuator components are in an initial position.

In the drawings the reference number 1 denotes an actuator comprising a cylindrical actuator housing 2 with a fitting 4 in its one end portion. The fitting 4 fits complementary to a valve housing 8 of a valve 6.

The valve 6 is opened and closed by rotating the shaft 10 of the valve 6, the shaft being connected to the actuator shaft 12 about its central axis.

The actuator 1 is provided with an element 14 in the form of compression springs for storage of mechanical energy. The compression springs 14 are biased between an end portion 16 of the actuator housing 2 relative to the fitting 4, and, relative to the spring housing 2, a concentrically and axially displaceable spring holder 18. The number of compression springs 14 is chosen based on the necessary output torque from the actuator 1 at electrical supply failure. The compression springs 14 are distributed at the inner shell of the actuator housing 2.

When compression springs 14 are biased, the spring holder 18 is displaced in the direction of the end portion 16 to an initial condition where the spring holder 18 is indirectly connected to the actuator housing 2 by means of a first releasable connector 20.

From the fitting end portion 22 of the actuator housing 2 a nut guide 24 in the form of an axial slit cylinder extends inward in the actuator housing 2 where it is connected to a fastener ring 26. The fastener ring 26 and the nut guide 24 are fixedly mounted to the fitting end part 22 and thereby to the actuator housing 2.

A motor 28 is positioned concentrically on the fastener ring 26 as the first releasable connector 20 is mounted on the motor 28.

From the motor 28 extends a drive shaft 30 concentrically in the actuator housing in the direction of the fitting end portion 22 and up to a gearbox 32. The drive shaft 30 constitutes the input shaft to the gearbox 32.

The gearbox 32 is releasably connected to the fastener ring 26 by means of a gearbox holder 34 and a second releasable connector 36. When the connector 36 is released, the gearbox 32 is free to rotate relative to the actuator housing 2 and thereby unable to exercise a torque around its output shaft 38. The output shaft 38 is connected to the actuator shaft 12 by means of a third releasable connector 40.

A threaded bushing 42 co-rotating with the output shaft 38 encircles the gearbox holder 34 between the fitting end portion 22 and the fastener ring 26. The threaded bushing 42 is outwardly provided with a relatively coarse pitch thread. If conditions so permitting, the threaded bushing 42 may be provided with multiple parallel threads.

A nut 44 complementary fitting the threaded bushing 42 runs along the threaded bushing 42 when the threaded bushing 42 is rotated, the nut 44 being prevented from rotating around its own axis by the slit nut guide 24.

An abutting face 46 on that side of the nut 44 facing towards the end part 16, fits complementary to a shoulder 48 on the spring holder 18.

The first releasable connector 20 is electrically controlled and releases on electric supply failure. The second releasable connector 36 is mechanically controlled and is arranged to disconnect when the spring holder 18 is disconnected from the first releasable connector 20. The third releasable connector 40 is electrically controlled and engages on electric supply failure.

In the actuator 1 initial condition, see FIG. 1, the spring holder 18 is in its initial position where the compression springs 14 are biased.

The first releasable connector 20 is held in a locked position by means of a control voltage. The second releasable connector 36 is in a locked position and the third releasable connector 40 is in a locked position in that no control voltage is applied to this one.

Releasable connectors 20, 36, 40 are found in a variety of designs and will be known to a person skilled in the art. Thus, they are not specified any further.

The motor 28 is arranged, via the gearbox 32, to rotate the actuator shaft 12 between its angular positions where the one angular position corresponds to the closed condition of the valve 6 and the other position corresponds to the open condition of the valve 6.

The nut 44 is, during normal operation, displaced freely up and down along the threaded bushing 42 in that the position of the nut 44 at the fitting end portion 22 corresponds to the safe position of the valve 6.

Figure 2:
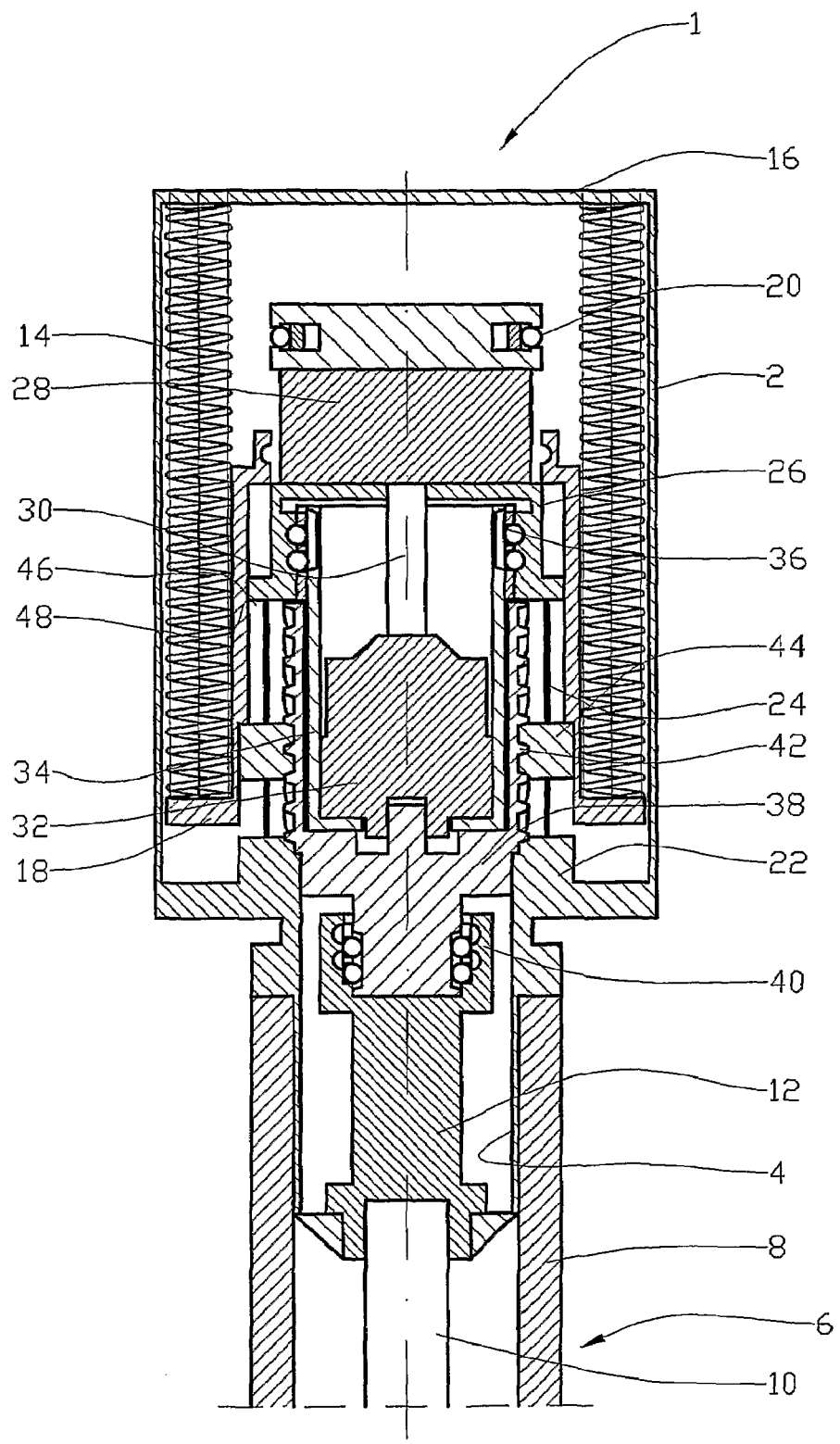
FIG. 2 shows the same as FIG. 1, but the actuator shaft is here under readjustment following an electric supply failure.

If the electrical supply to the actuator should fail, see FIG. 2, the first releasable connector 20 will be released.

The compression springs 14 displace the spring holder 18 in the direction of the fitting end portion 22 whereby the second releasable connector 36 is released. The gearbox holder 34 and the gearbox 32 can thereby rotate freely in the actuator housing 2 and transmits thus no torque between the drive shaft 30 and the output shaft 38.

When the shoulder 48 of the spring holder 18 impacts the nut 44, the nut 44, being prevented from rotating around its central axis, is displaced along the threaded bushing 42. The threaded bushing 42 is thereby brought to rotate the shaft 10 via the output shaft 38, the third releasable connector 40 and the actuator shaft to a safe position.

Figure 3:
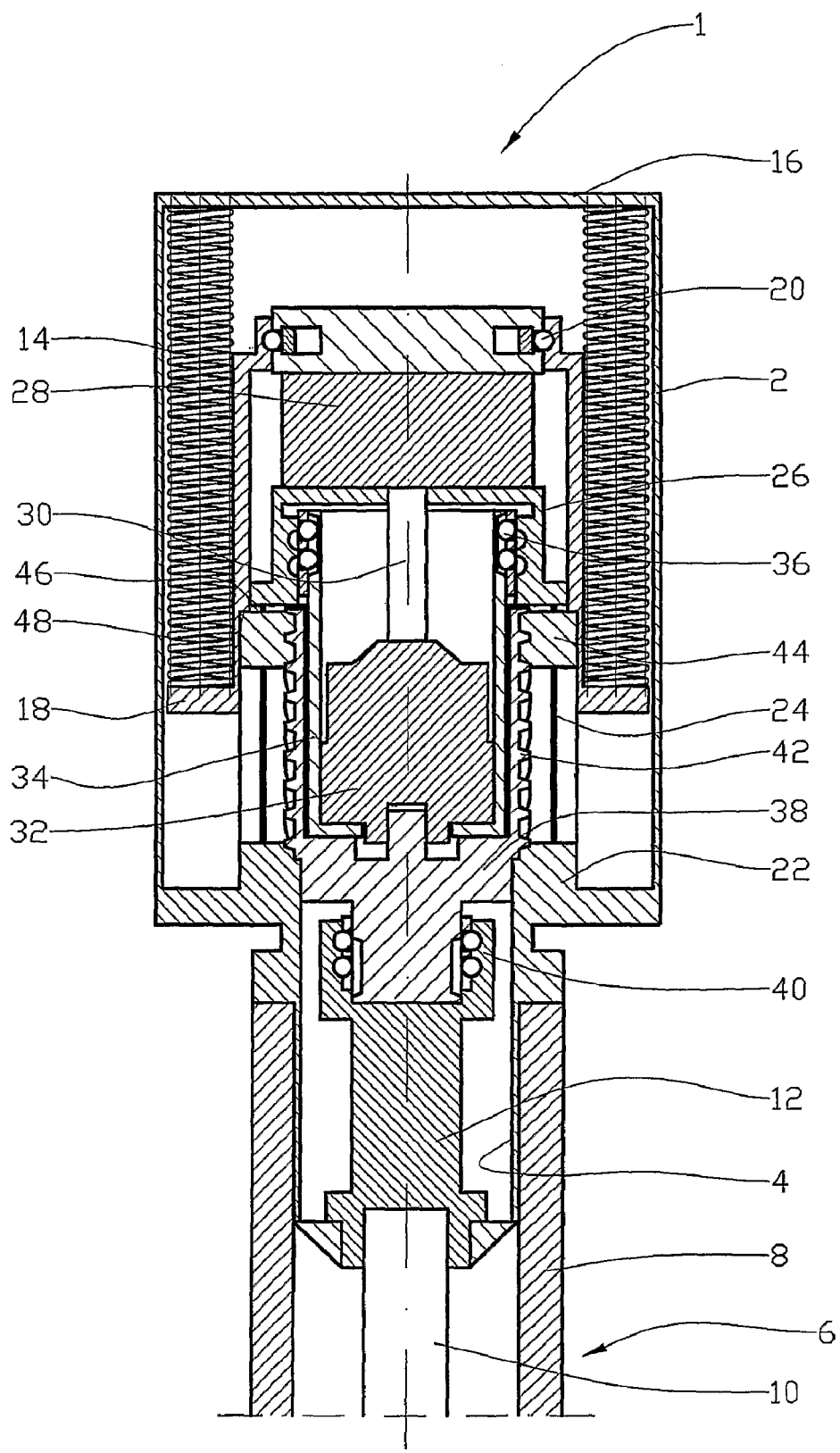
FIG. 3 shows the actuator of FIG. 1 when the actuator spring is biased to its initial condition.

The compression springs 14 may, as described below, be biased without rotating the actuator shaft 12 by supplying voltage to the third releasable connector 40 whereby this connector is released, see FIG. 3.

The motor 28 rotates the drive shaft 30 in a direction that drives the nut 44 in a direction towards the compression springs 14. The second releasable connector 36 locks the gearbox holder 34 from rotating in the corresponding direction of rotation. After the first releasable connector 20 has locked the spring holder 18, the nut is moved to a position by the fittings end portion 22, after which the third releasable connector 40 is brought to connect the output shaft 38 to the actuator shaft 12. The actuator 1 is now brought back to its initial condition.

The invention claimed is:

1. An actuator device comprising
an actuator housing with a fitting for connecting said actuator to an object,
a motor which via one or more transmission elements drives an output actuator shall, wherein said actuator shaft is rotationally disconnectable from said motor, said actuator shaft being rotatable between a first and a second angular position, said first angular position corresponding to said object being in a first condition and said second angular position corresponding to said object being in a second condition,
an element for storage of mechanical energy, said element by energy cut-off to the actuator being releasably arranged to be able to displace a nut being prevented from rotating around a longitudinal axis, along a screw thread complementary fitting to said nut, and connected to said actuator shaft, whereby said actuator shaft is rotated between said first and second angular positions.

2. A device according to claim 1, further comprising said nut is displaceable back to an initial condition where the element has been supplied with energy by rotation of said screw thread in an opposite rotational direction.

3. A device according to claim 1, said element comprising at least one spring being biased between said actuator housing and a spring holder being displaceable relative to said actuator housing, said spring holder being releasably connectable to said actuator housing by a first releasable connector.

4. A device according to claim 3, said nut comprising an abutting face facing a shoulder of said spring holder.

5. A device according to claim 1, further comprising a gearbox and gearbox housing, between said motor and said actuator shaft, wherein said gearbox housing is connected to said actuator housing via a second releasable connector.

6. A device according to claim 5, further comprising said screw thread connected to an output shaft of said gearbox.

7. A device according to claim 6, further comprising said output shaft of said gearbox connected to said actuator shaft by a third releasable connector.

* * * * *